Nov. 24, 1964     R. W. GILBERT     3,158,838
ELECTRICAL SIGNAL CLASSIFIER UTILIZING MAGNETIC ELEMENTS
Filed June 12, 1962     3 Sheets-Sheet 1

INVENTOR
ROSWELL W. GILBERT
BY C. A. Weigel, Jr.
ATTORNEY

INVENTOR
ROSWELL W. GILBERT

United States Patent Office 3,158,838
Patented Nov. 24, 1964

3,158,838
ELECTRICAL SIGNAL CLASSIFIER UTILIZING
MAGNETIC ELEMENTS
Roswell W. Gilbert, East Orange, N.J., assignor to Weston Instruments, Inc., a corporation of Texas
Filed June 12, 1962, Ser. No. 201,998
10 Claims. (Cl. 340—172)

This invention relates to apparatus for determining the amplitude of an electrical signal and, more particularly, to apparatus employing magnetic elements for classifying an electrical signal according to its amplitude.

In the field of industrial control it is often necessary to determine whether the amplitude of an electrical signal, which may be a function of temperature, thickness, pressure, etc., is within acceptable amplitude limits, is less than such limits, or is greater than such limits. For example, a conventional thickness gauge may provide a continuous electrical output signal representative of the thickness of a sheet of steel. It may be desirable in a rolling mill operation, for example, to maintain the sheet thickness within certain tolerance limits; i.e., within a class or range of acceptable thicknesses. Any thicknesses above or below this range of desired thicknesses are unacceptable. Depending upon whether the thickness of the steel sheet is above or below the acceptable range of thicknesses, conventional control circuitry may be energized to either increase or decrease the pressure of the rollers that are forming the sheet of steel. Alternatively, one may wish to continuously measure the thickness of a roll of steel sheet and classify the portions of the roll (which typically vary in thickness) according to their thickness.

Existing apparatus used to classify an electrical signal into classes, each typically encompassing varying ranges of amplitude, have been somewhat complex and hence relatively costly. For example, some systems have used full analog-to-digital conversion techniques and then digital computer techniques for classifying the digital representation of the electrical signal. Such systems are adequate, but unfortunately are quite costly.

It is therefore an object of this invention to obviate the disadvantages of the prior art electrical signal classifiers.

Another object of this invention is to facilitate the classification of an electrical signal into amplitude ranges by relatively simple yet precise apparatus.

Still another object of this invention is to use magnetic comparators to classify an electrical signal into amplitude ranges.

In an illustrative embodiment of this invention, the apparatus for classifying an electrical input signal according to its amplitude includes a plurality of pulse type magnetic comparators. Each of the magnetic comparators has an input winding, an interrogation winding, a reference winding, and an output winding on a single saturable magnetic core. A plurality of sources of reference current, each source connected to the reference winding of a different one of the magnetic comparators for magnetizing the magnetic core of each amplifier in a first sense. The signal windings are connected in series circuit and the input electrical signal is applied to the series circuit in such polarity as to magnetize the core of each comparator in a second sense opposite the first sense. The interrogation windings of the comparators are connected in series and an interrogation pulse of suitable polarity is applied across the series combination to magnetize the core of each comparator in the first sense which aids the reference current. The interrogation pulse passes through to the output winding of that one comparator corresponding to the amplitude class into which the amplitude of the input electrical signal falls. The comparator passing the interrogation pulse is the one whose reference current amplitude is less than but closest to the amplitude of the input signal.

Further advantages and features of this invention will become apparent upon consideration of the following description read in conjunction with the drawings wherein.

Figure 1:
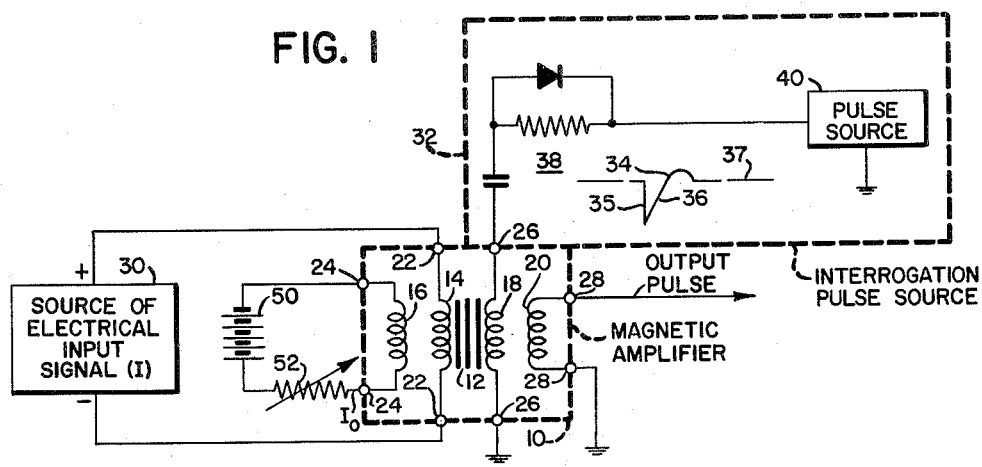
FIGURE 1 is a part schematic and part block diagram of a magnetic comparator suitable for use with this invention.

Referring to FIG. 1, there is illustrated a pulse type magnetic comparator or switching circuit depicted by the dotted rectangle 10 that may be used with the electrical signal classifier of this invention. The terms "magnetic comparator" or "magnetic switching circuit" are used synonomously herein to mean a device using wound saturable magnetic cores, either alone or in combination with other circuit elements, to secure control, or amplification if desired, and which are based on a process of magnetizing a core or cores by a pulsating magnetomotive force and by simultaneously applied unidirectional magnetomotive forces. It may be noted that the magnetic comparator illustrated in FIG. 1 is merely an illustration of a typical magnetic amplifier that may be used with this invention; as any other suitable magnetic amplifier may be used.

The magnetic comparator 10 includes a saturable magnetic core 12 which may be toroidal in form, has a low coercivity to permit its easy magnetic saturation, and may be tape wound or laminated. A suitable material available commercially for the core 12 is "supermalloy." The core 12 has four windings each wound in the same direction on the core and each having the same number of turns. These windings include a signal input winding 14, a reference winding 16, an interrogation winding 18, and an output winding 20. The ends of each of the windings 14, 16, 18, and 20 are connected respectively to first and second input terminals 22, 24, 26, and 28 which in turn are connected to appropriate input and output circuitry for the comparator 10. Thus a source of an electrical input signal 30, which is to be classified according to its amplitude, is connected to the input terminals 22 such as to drive or magnetize the core 12 in a first sense toward a state, which for convenience, may be termed the P sense of magnetic saturation.

In like manner the reference winding input terminals 24 are connected to a reference current source which may include a source of potential, illustrated by the battery 50, connected in series with a variable resistor 52. The current supplied by the reference current source is of such polarity as to establish a magnetic flux in the core 12 in a second sense opposite to the first sense. This second sense will be referred to as the N sense of magnetization. The interrogation winding terminals 26 are connected across an interrogation pulse source 32 which provides a negative-going (with respect to ground) interrogation pulse 34. Since the windings are all wound in the same direction, the interrogation pulse 34 drives the core 12 toward the N sense of magnetization, i.e., in the same sense as the reference current.

The negative-going interrogation pulse 34 preferably has a sharp rise time 35 and a slower fall and recovery period 36. The slower fall and recovery period 36 prevents ringing in the magnetic circuitry. The pulse is D.-C. restored by a conventional D.-C. restorer 38 (which includes a parallel connected diode and resistor in series with a capacitor) to maintain the base line 37. The interrogation pulse 34 may be derived initially from any suitable pulse source 40 such as a blocking oscillator. Lastly, the output winding terminals 28 are connected between ground and a suitable output pulse line which may be connected to suitable utilization circuitry which will be described in conjunction with FIGS. 2 and 3.

The operation of the magnetic comparator 10 is conventional. Depending upon the adjustment of the variable resistor 52, the battery 50 passes a reference current $I_0$ of varying magnitude through the reference current winding 16. It has been stated that for a reference current of the polarity indicated, a magnetic flux is established which drives the core 12 in the N sense of magnetization. The input electrical signal I, which is to be classified establishes a magnetic flux in the core 12 opposite to that of the reference current, i.e., such as to drive the core 12 toward the P sense of magnetization. Depending upon the relative magnitudes of the reference current $I_0$ and the input signal current I, the net magnetization of the core 12 is in the P or N sense of magnetization. In the event the signal current I and the reference current $I_0$ are equal in amplitude, the core 12 remains substantially unmagnetized.

Now with the application of the interrogation pulse 34, its resulting magnetizing, or magnetomotive force, drives the core 12 in the N sense of magnetization, which is in the same sense as the magnetizing force provided by the reference current $I_0$. If the amplitude of the signal current I is smaller than the amplitude of the reference current $I_0$, the net magnetization $(I_0-I)$ of the core 12 also is in the N sense. Using a core 12 having a low coercivity, the net magnetizing force $(I_0-I)$ typically is sufficient to magnetically saturate the core 12. Hence, little or no flux change occurs within the core 12 with the advent of the interrogation pulse 34 and no output signal is induced in the output winding 20. On the other hand, if the signal current I is larger than the reference current $I_0$, the net magnetization of the core 12 is in the P sense. The interrogation pulse 34, producing a magnetizing force in the opposite, or N sense, causes a flux change in the core 12 which couples the interrogation pulse into output winding 20.

The interrogation pulse source 32 should be capable of delivering a current of sufficient magnitude to overcome the maximum net magnetization $(I-I_0)$ of the core 12 due to the maximum anticipated amplitude of the signal current I. Otherwise the interrogation pulse will be insufficient in amplitude to flux link the core, and no output signal will develop. Additionally, the interrogation pulse 34 should have a voltage-time integral at least somewhat smaller than the flux linkages established in the core 12 by the net magnetizing current $(I-I_0)$.

The total number of flux linkages produced in the core 12 by the interrogation pulse is expressed by Faraday's Law. Faraday's Law equates the voltage-area of the exciting current, expressed in volt-seconds, to flux linkages (number of turns in the winding multiplied by the flux lines linking them). If the interrogation pulse has a volt-second area that is too large, the core 12 becomes magnetically saturated and the interrogation pulse 34 produces unwanted pulses in other magnetic amplifiers as will be described in conjunction with FIG. 2. These criteria allow most of the voltage drop in the interrogation circuit to occur across only one magnetic amplifier 10 and yet avoid magnetically saturating the core 12 of that one amplifier.

Figure 2:
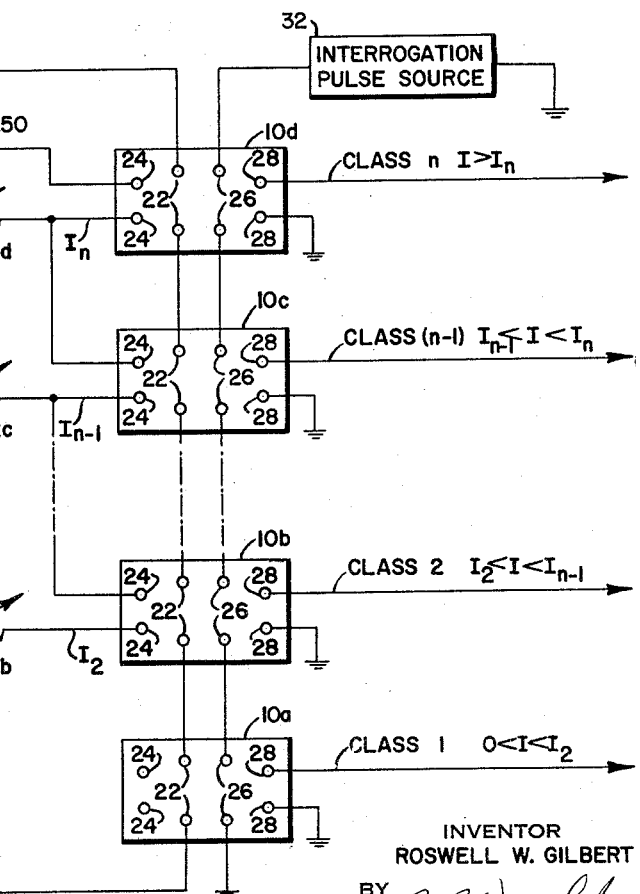
FIG. 2 is a part schematic and part block diagram of an electrical signal classifying apparatus constructed in accordance with one embodiment of this invention.

In FIG. 2 there is illustrated an electrical signal classifier capable of classifying an electrical input signal I into one of four different classes according to its amplitude; namely, Class 1, Class 2, Class $(n-1)$ and Class $n$.

Separate magnetic comparators 10a, 10b, 10c, and 10d, of the type shown in FIG. 1, are provided for each of the classes 1, 2, $n-1$, and $n$. The interrogation input terminals 26 of each of the comparators 10a, 10b, 10c, and 10d, are serially connected across the interrogation pulse source 32. In like manner, the signal input terminals 22 of each of the comparators 10a, 10b, 10c, and 10d, are serially connected across the electrical input signal source 30 in the same polarity. Individual output lines are connected across the output terminals 28 of each of the comparators 10a, 10b, 10c, and 10d. Suitable reference current sources are connected to the reference current input terminals 24 of each of the Class 2, Class $(n-1)$, and Class $n$ comparators 10b, 10c, and 10d, respectively. The reference currents, which may be designated $I_2$, $I_{n-1}$, and $I_n$ for the respective Class 2, Class $(n-1)$ and Class $n$ comparators, establish the limits or boundaries to the current amplitude ranges defining the several classes into which the electrical signal from the source 30 is to be classified. These reference currents may be derived, as in FIG. 1, from a source of potential illustrated as the battery 50, the positive terminal of which is connected through parallel variable resistors 52b, 52c, and 52d to the lower one (in the drawing) of the reference current input terminals 24 of the respective comparators 10b, 10c, and 10d. The particular amplitudes of the reference currents are adjustable by varying the resistors 52b, 52c, and 52d. It may be noted that the Class 1 comparator 10a has no reference current and hence, as will be described hereinafter, provides an output pulse in the event the input signal I has an amplitude more than zero and less than the reference current $I_2$. The reference currents are selected such that $I_2 < I_{n-1} < I_n$. Hence the Class 2 comparator covers the amplitude range $I_2 < I < I_{n-1}$, the Class $n-1$ comparator, the range $I_{n-1} < I < I_n$, and the Class $n$ comparator the range $I > I_n$.

In the operation of the signal classifier of FIG. 2, let us assume that the input signal I is greater in amplitude than the reference current $I_2$ but less in amplitude than the reference current $I_{n-1}$. Under these conditions the Class $n-1$ and class $n$ comparators 10c and 10d, respectively, are magnetically saturated, i.e., their cores 12 (FIG. 1) are magnetically saturated in the N sense of magnetization since the reference currents $I_n$ and $I_{n-1}$ are greater in amplitude than the signal current I. The Class 2 magnetic comparator 10b, on the other hand, is magnetized in the first, or P sense of magnetization since $I > I_2$. In like manner the Class 1 comparator 10a is magnetized in the P sense by the input signal current I. Now with the occurrence of the negative-going interrogation pulse 34 (FIG. 1) from the interrogation pulse source 32, a magnetizing force in the second or N sense is applied to the cores 12 (FIG. 1) of each of the amplifiers 10. Since the class $(n-1)$ and class $n$ comparator 10c and 10d, respectively, are already magnetized in the N sense, little or no change in magnetic flux occurs and hence no output pulse results at either of their output terminals 28.

Such is not the case in the Class 2 magnetic comparator 10b. The interrogation pulse 34 (FIG. 1) drives its core 12 (FIG. 1) in the N sense of magnetization. Since its core 12 was magnetized in the P sense by the input signal I, the resulting flux change induces an output pulse across its output terminals 28. This output signal correctly denotes the input signal I which has an amplitude greater than $I_2$ but less than $I_{n-1}$. The Class 1 comparator 10a causes little or no output pulse even though it also is magnetized in the same sense as the class 2 comparator 10b. Its core 12 (FIG. 1) is more heavily magnetized in the P sense by the input signal current I than the core 12 of the class 2 comparator. Hence the flux build-up in the class 2 comparator 10b occurs more quickly with the occurrence of the interrogation pulse. With the quicker flux build-up in the class 2 comparator 10b, its interrogation winding presents a relatively high impedance to the interrogation pulse current to the extent that no other cores are flux linked to any appreciable extent.

The function of the interrogation pulse 34 (FIG. 1) is to flux link the core of that comparator 10 having the least net magnetization of opposite sense to the sense of the magnetizing force provided by the interrogation pulse. This in effect transfers the pulse to the corresponding output terminals 28 of that comparator 10 whose core has the least net magnetization of opposite sense to the sense of the interrogation pulse.

If at the instant of interrogation the amplitude of the input current I equals or is extremely close to the amplitude of one of the reference currents, a boundary condition exists and two partial pulses from each of two comparators 10 may occur instead of a single pulse from a single element. For example, if $I=I_{n-1}$, the core 12 (FIG. 1) of the class $(n-1)$ comparator 10c is flux linked by the input signal current I. Under these conditions the voltage-time integral of the interrogation pulse 34 may be sufficiently great to magnetically saturate the core of the class $(n-1)$ comparator 10c in the N sense of magnetization. Upon saturation, the impedance presented to the interrogation current drops to substantially zero. The interrogation pulse voltage is then applied to the class 2 magnetic comparator 10b such that a partial pulse may be delivered on the output winding of the class 2 comparator in addition to the class $(n-1)$ comparator 10c. This is a boundary ambiguity and may be avoided by the utilization of the logic circuit illustrated in FIG. 3.

Figure 3:
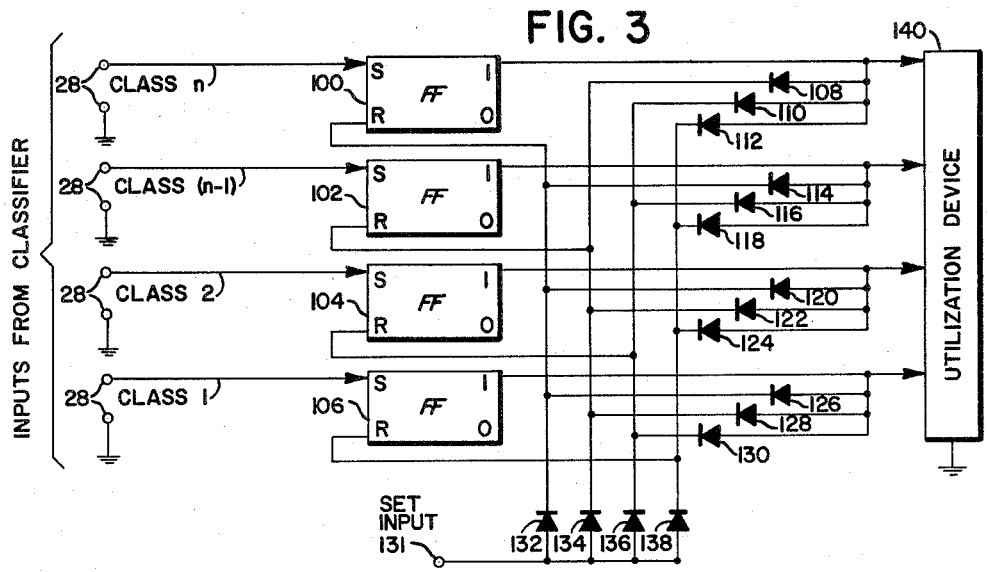
FIG. 3 is a block diagram of a logic circuit that may be used to eliminate ambiguities in the output of the signal classifier of FIG. 2, in the event the amplitude of the input electrical signal falls on or close to a class amplitude boundary.

In FIG. 3 the set inputs (S) of each of four flip-flops 100, 102, 104, and 106 are connected to the respective output terminals 28 of the class 1, class 2, class $(n-1)$ and class n amplifiers 10 (FIG. 2). Each of the flip-flops 100, 102, 104, 106 have a set input (S), a reset input (R), and corresponding "1" and "0" outputs. The application of a high level signal or pulse to the set input terminal S of any flip-flop provides a corresponding high signal level on its "1" output terminal. A corresponding high signal level or pulse on the reset input terminal (R) provides a high signal output level on the "0" output terminal.

The "1" outputs of each of the flip-flops 100, 102, 104, and 106 are connected respectively to a suitable utilization device 140 which may receive the pulse information. Additionally the "1" output of the first flip-flop 100 is connected in the forward conducting direction through respective diodes 108, 110, and 112 to the reset inputs R of the second flip-flop 102, the third flip-flop 104, and the fourth flip-flop 106. In like manner the "1" output of the second flip-flop 102 is connected through the respective diodes 114, 116, and 118 in their forward conducting direction to the respective reset inputs R of the first, third and fourth flip-flops, 100, 104, and 106. Also the "1" output of the third flip-flop 104 is connected through respective diodes 120, 122, and 124 to the reset inputs R of the first, second, and fourth flip-flops 100, 102, and 106, respectively. Finally the "1" output of the fourth flip-flop 106 is connected through respective diodes 126, 128, and 130 in their forward conduction direction to the reset inputs R of the first, second, and third flip-flops 100, 102, and 104, respectively. A set input pulse, available at the terminal 131 may be connected through respective diodes 132, 134, 136, and 138, in their forward conducting direction, to the reset input R of each of the first, second, third, and fourth flip-flops 100, 102, 104, 106, respectively.

The application of a positive going pulse at the set input terminal 130 resets each of the flip-flops 100, 102, 104, 106 such that their "1" outputs are at a low signal level. It may be observed that these flip-flops are interconnected logically by the several diodes so that only one flip-flop may remain in the "1" state. Assume, for example, that the class $(n-1)$ comparator 10c (FIG. 2) passed an output pulse at its terminals 28 to the second flip-flop 102 and a fraction of a second later the class 2 comparator 10b, due to the boundary condition described, passes a pulse to the third flip-flop 104. Upon receipt of the pulse from the class $(n-1)$ comparator output terminals 28, the second flip-flop 102 is immediately set providing a high level "1" output signal. The high level "1" output passes through the several diodes, 114, 116, and 118 to maintain each of the remaining flip-flops 100, 104, 106 reset. Thus when the pulse from the class 2 amplifier output terminals 28 is applied to the set input S of the third flip-flop 104, it is disabled and remains reset. Only the second flip-flop 102 provides a high level output signal. Hence the ambiguity is resolved.

Figure 4:
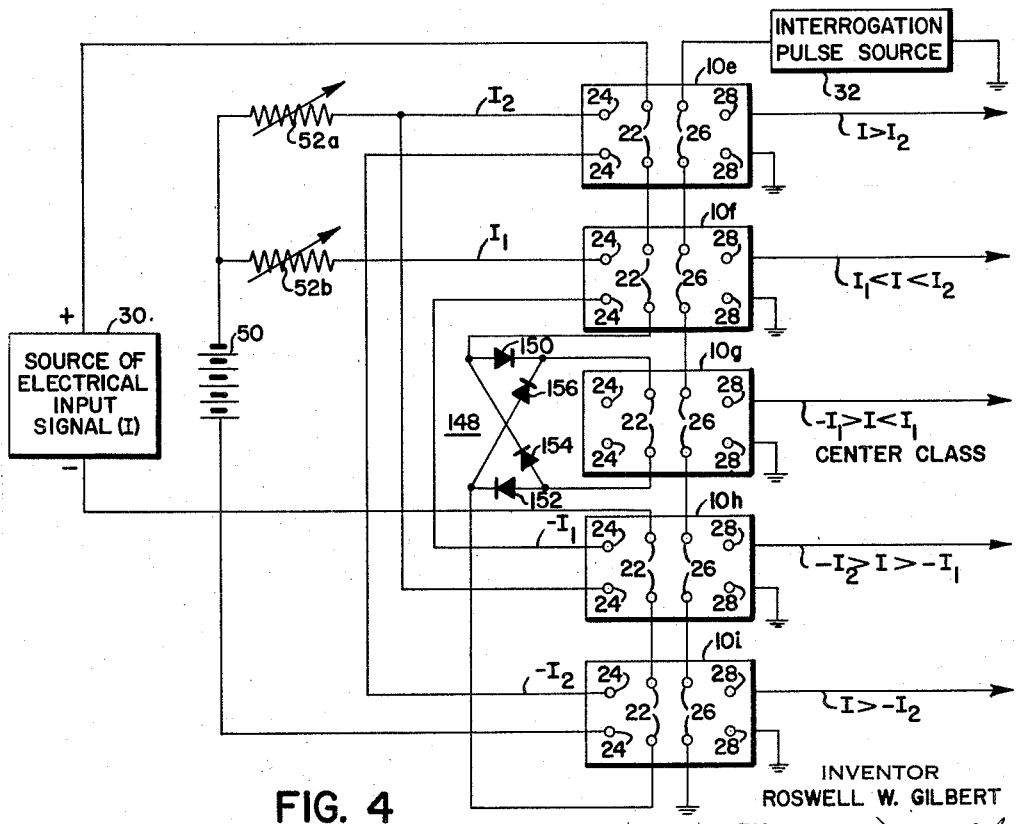
FIG. 4 is a part block and part schematic diagram of an electrical signal classifier constructed in accordance with another embodiment of this invention.

In FIG. 4 there is illustrated still another embodiment of an electrical signal classifier constructed in accordance with this invention. The classifier illustrated in FIG. 4 is substantially identical to that illustrated in FIG. 2, the difference being that the classifier of FIG. 4 is useful for classifying electrical input signals representing plus and minus deviations from a zero or centerpoint which corresponds possibly to a "bogey" dimension of a sheet of steel, for example. In FIG. 4 there are illustrated five magnetic comparators 10e, 10f, 10g, 10h, and 10i of the type illustrated in FIG. 1. Each of the magnetic comparators 10 have their interrogation terminals 26 connected in series across the interrogation pulse source 32 and their output terminals 28 connected to individual output lines in substantially the same manner as in FIG. 2. The third magnetic comparator 10g has no input reference current connection to its terminals 24 and hence corresponds to a center classification in which the input current varies positively and negatively with respect to zero current. The first and second comparators 10e and 10f, respectively, have their reference winding input terminals 24 connected, respectively, to receive reference currents $I_2$ and $I_1$ in which $I_2>I_1$, through the respective variable resistors 52a and 52b from the negative side of a source of potential illustrated as the battery 50. The fourth magnetic comparator 10h has its reference winding terminals 24 serially connected to the reference winding input terminals 24 of the second comparator 10f, but with the connections reversed such that its reference current is $-I_1$ instead of $+I_1$. In like manner the reference winding input terminals 24 of the fifth comparator 10i are serially connected with the input terminals 24 of the first comparator 10e but again with the connecting wires interchanged such that its reference current is $-I_2$ instead of $+I_2$.

With these several reference currents establishing the class boundaries, the first comparator 10e corresponds to the input signal $I>I_2$. In like manner the second comparator covers the class $I_1<I<I_2$. The third comparator 10g corresponds to the class $-I_1>I<I_1$; the fourth comparator 10h corresponds to the class $-I_2>I>-I_1$; and the fifth comparator 10i covers the class where the input current is $I>-I_2$. The source of the electrical input signal 30 is connected across the series combination of each of the input signal winding terminals 22. The center class comparator 10g is provided with a rectifier network 148 to pass the input signal current I regardless of polarity in the same direction through its signal input winding 14 (FIG. 1). The bypass functions to pass the signal current in the proper direction to magnetize the core 12 (FIG. 1) of the center class comparator 10g in a sense opposite that of the interrogation winding 18 (FIG. 1). Additionally, the connections of the input signal source 30 to the input signal terminals 22 of the fourth and fifth comparators 10h and 10i are reversed to accommodate negative input currents.

The rectifier network 148 includes first and second diodes 150 and 152 which are serially connected to the respective terminals 22 of the third comparator 10g and connected with respect to polarity to pass a positive going current from the input signal source 30. In like manner a third diode 154 has its anode connected to anode of the second diode 152 and its cathode connected to the anode of the first diode 150. The fourth diode 156 has its anode connected to the cathode of the second diode 152 and its cathode connected to the cathode of the first diode 150. Thus connected, the third and fourth diodes 154 and 156 pass a negative input signal (with respect to ground) through the input signal winding 14 (FIG. 1) in the same direction as a positive input signal.

Depending upon the polarity and amplitude of the input signal I from the source 30, one of the five comparators 10e through 10i, inclusive, passes the interrogation pulse to a suitable utilization device. The operation of the classifier is substantially the same as that illustrated in FIG. 2 and need not again be described. Since the connections of the input signal to the fourth and fifth comparator 10h and 10i input winding terminals 22 is reversed, negative input signals behave as the positive signals as described in FIG. 2. Negative input signals applied to the first two comparators 10e and 10f and positive input signals applied to the fourth and fifth comparators 10h and 10i, drive their cores in the N sense of magnetization as do the reference and interrogation currents. Hence no output signals occur in their output windings.

Figure 5:
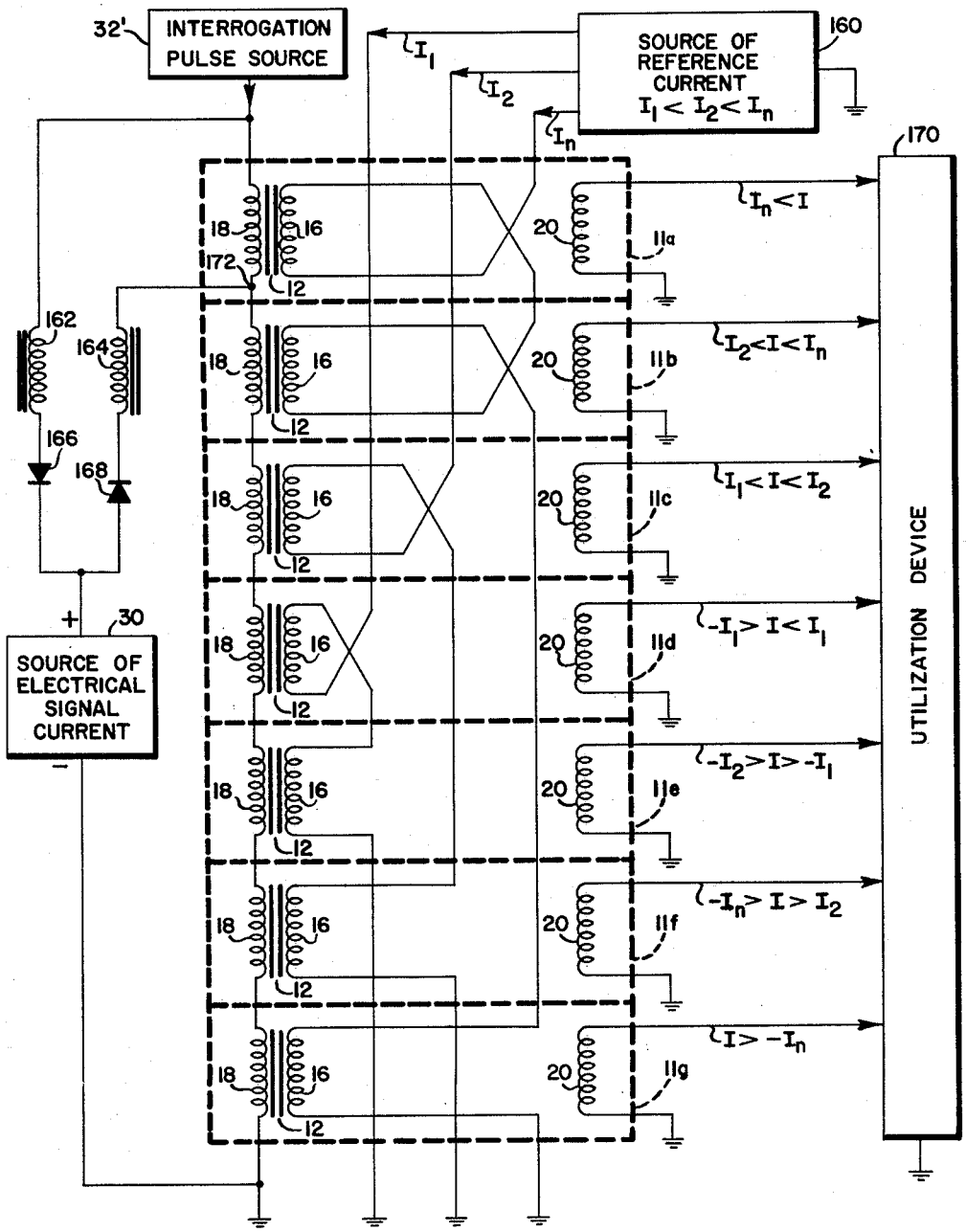
FIG. 5 is a part block and part schematic diagram of an electrical signal classifier constructed in accordance with a third embodiment of this invention.

FIG. 5 illustrates still another embodiment of the present invention which is an alternative to that illustrated in FIG. 4. The embodiment of FIG. 5 simplifies that of FIG. 4 by introducing the input signal current directly into the interrogation pulse windings, thereby eliminating the need for the signal windings of each of the magnetic comparators. The embodiment of FIG. 5 classifies an input signal according to its amplitude and polarity into one of seven classes depending upon whether the input signal $\pm I$ is less than or more than the class boundaries determined by the several reference currents $\pm I_1$, $\pm I_2$, or $\pm I_n$.

In FIG. 5 there are illustrated seven magnetic comparators 11a–11g inclusive. The magnetic comparators 11 are of substantially the same type illustrated in FIG. 1, except that they have no signal input winding 14 (FIG. 1). Thus each of the output windings 20 (FIG. 5) is connected to a suitable utilization device 170. A source of reference current 160 provides positive reference currents (with respect to ground) of $I_1 < I_2 < I_n$. These reference currents are connected to selected ones of the comparators 11a to 11g to establish the several class boundaries. The first reference current $I_1$ is serially connected to the reference current windings 16 of the fourth and fifth comparators 11d and 11e with the connections to the fourth comparator 11d reference winding 16 reversed to drive the core 12 in the N sense of magnetization rather than the P sense.

In like manner the $I_2$ reference current is serially connected through the reference windings 16 of the third and sixth comparators 11c and 11f with the connection to the third comparator 11c reference winding 16 reversed to drive its core 12 in the N sense of magnetization. Lastly, the reference current $I_n$ from the source 160 is serially connected through the reference current windings 16 of the first, second, and seventh comparators 11a, 11b, and 11g, respectively. The connections to the first and second comparator 11a and 11b reference windings 16 is reversed to drive their respective cores 12 in the N sense of magnetization. These referennce currents establish the several classes:

$$I > I_n$$
$$I_2 < I < I_n$$
$$I_1 < I < I_2$$
$$-I_1 > I < I_1$$
$$-I_2 > I > -I_1$$
$$I_n > I > -I_2$$
$$I > -I_n$$

The interrogation pulse source 32′, which may be substantially the same as the source 32 (FIG. 1), is connected to pass positive-going (with respect to ground) current pulses through the interrogation windings 18 of each of the comparators 11a to 11g, inclusive. The positive-going interrogation pulses drive the core 12 of each comparator in the P sense of magnetization and otherwise have the same wave form (with their polarity inverted) as the pulses 34 (FIG. 1).

Thus far described, the signal classifier of FIG. 5 is substantially the same as those previously described herein. In accordance with this embodiment of the invention, however, the source of electrical signal current 30 is connected, through the cathode side of a diode 166 and a serially connected choke 162, across the series connected, interrogation windings 18 of the comparators 11a to 11g. This provides the current path through the interrogation windings 18, when the input signal is negative going with respect to ground. An alternative current path is provided for positive-going input signals through the anode side of a second diode 168 and a choke 164 to the junction 172 between the windings 18 of the first and second comparators 11a and 11b. Positive-going signals thus are connected across the interrogation windings 18 of each of the second through seventh comparators 11b through 11g, inclusive.

The operation of the embodiment of FIG. 5 is quite similar to that of FIG. 4. The interrogation pulse from the source 32′ flux links that one comparator 11a–11g whose core 12 is nearest zero magnetization in the N sense, and passes a pulse to the output winding 20 of that comparator. The interrogation pulse passes through all other comparators whose cores are more heavily magnetized in the negative sense N or magnetized in the positive sense P.

Assume, for example, that the input signal I is greater in negative amplitude than the reference current $I_n$. In this instance the core 12 of the seventh comparator 11g is magnetically biased slightly in the N sense of magnetization. With the occurrence of the interrogation pulse, which drives each of the cores 12 toward the P sense of magnetization, an output pulse is induced in the output winding 20 of the seventh comparator 11g. The cores 12 of the fifth and sixth comparators 10e and 10f are also magnetically biased in the N sense of magnetization, but provide no output pulse in that the primary voltage drop occurs across the interrogation winding 18 of the seventh comparator 11g since its core is the most easily driven in the P sense of magnetization. In like manner, each of the first four comparators 11a to 11d, inclusive, is magnetically saturated in the N sense of magnetization by both the reference current and the signal current. The magnetizing forces produced by the reference and signal currents are too great to permit the interrogation pulse to have any effect for the same reason as was described in connection with the sixth comparator 11f. Hence, only one output pulse is provided, and that on the output line of the seventh comparator 11g to properly denote that the input signal current is greater in negative magnitude than the reference current $-I_n$.

As another illustrative example, assume that the amplitude of the input signal current I falls between $I_2$ and $I_n$. In this instance, since the reference current of the second comparator 11b exceeds the amplitude of the signal current I, its core 12 is magnetically biased slightly in the N sense. Hence the interrogation pulse, applying a magnetizing force in the P sense, switches the core 12 of the second comparator 10b to the P sense of magnetization. This flux linkage produces a magnetic flux change which results in an induced output pulse in the output winding 20, of only the second comparator. Since most of the voltage drop occurs across the interrogation winding 18 of the second comparator 11b, there is insufficient current to produce any output pulse in the first comparator 11a. It may be recalled that the first comparator 11a receives no signal current due to the by-pass connection of the second diode 208 and hence is very heavily driven in the N sense of magnetization.

Each of the remaining comparators 11c through 11g, inclusive, provides no output pulse since the core 12 of each is already magnetized, and in fact are magnetically saturated in due to their low coercivity, in the P sense. In the third comparator 11c, for example, the signal current amplitude I exceeds that of the reference current. The signal current I is of such porality as to drive that core 12 in the P sense of magnetization. In the last three comparators 11e thorugh 11g, inclusive, both the reference and signal currents drive the respective cores 12 in the P sense of magnetization.

If, for example, the input signal I amplitude is greater than the amplitude of the positive reference current $I_n$, the core 12 of the second comparator 11b has a net magnetization in the P sense, preventing any output pulse. This leaves only the first comparator 11a core 12 that is magnetized in the N sense by the reference current $I_n$, and hence the flux change occurs therein to induce an output voltage on the output winding 20 of the first comparator 11a.

It is to be understood that the number of turns of the several signal and reference windings in the several comparators used in the several embodiments of this invention, may be varied and be proportioned to obtain various proportional responses. Additionally, the winding direction may be designed to accommodate either positive or negative signal currents. The classifier of this invention has a particular advantage in that the isolated input windings permit differential mode input circuits to be used.

There has thus been described, an improved electrical signal classifier that is simple, accurate, and relatively inexpensive. The boundary levels between classes are easily and relatively precisely established and may be quickly changed merely by changing the amplitude of a reference current as described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus for classifying an input electrical signal according to its amplitude into one of a plurality of amplitude defining classes comprising, in combination,
   a plurality of saturable magnetic comparators each having first, second, and third input windings and an output winding,
   a source of interrogation pulses,
   means connecting said first input windings in series across said source for generating an output signal in said output windings,
   a plurality of reference current sources each providing a different amplitude of reference current,
   means connecting each of said reference current sources to a different one of the second input windings in such polarity as to reduce the amplitude of said output signal, and
   means applying said input signal to the third input winding of each of said comparators in such polarity as to increase the amplitude of said output signal, whereby said output signal exists substantially only on the output winding of that one comparator whose reference current amplitude is less than the amplitude of said input signal by the least amount, thereby to provide an indication of the amplitude class of said input signal.

2. The apparatus set forth in claim 1 wherein each of said interrogation pulses each has a potential-time integral less than that required to magnetically saturate said one magnetic comparator, and a peak amplitude greater than the difference between said input signal and any of said reference currents.

3. Apparatus for classifying an input electrical signal according to its amplitude into one of a plurality of amplitude defining classes comprising, in combination,
   first, second, and third magnetic switching circuits each having a separate output winding,
   a source of interrogation pulses,
   means serially connecting a first winding of each of said switching circuits across said source of interrogation pulses for generating an output signal in said output windings,
   a source of reference current,
   means serially connecting the second input windings of the first and third ones of said switching circuits across said source of reference current to reduce the amplitude of said output signal from said first and third switching circuits,
   means applying said input signal across a serially connected third input winding of each of said switching circuits, said input signal being applied in one polarity to the third input winding of said first switching circuit to increase the amplitude of said output signal, and in another polarity opposite said first polarity to the third input winding of said third switching circuit, thereby to provide an output signal on the output winding of that one switching circuit whose reference current is of the same polarity as and has an amplitude less than the amplitude of said input signal by the least amount, thereby to classify said input signal of either polarity into a class in accordance with the amplitude and polarity of the reference currents.

4. The apparatus set forth in claim 3 wherein,
   the third input winding of said second input circuit includes a diode network means for passing said input signal therethrough in the same direction regardless of polarity.

5. The apparatus set forth in claim 4 wherein said interrogation pulse has an energy content less than that required to magnetically saturate any one of said magnetic switching circuits.

6. Apparatus for classifying an input electrical signal according to its amplitude into one of a plurality of amplitude defining classes comprising, in combination,
   first, second, and third magnetic switching circuits each having a separate output winding,
   a source of interrogation pulses,
   means serially connecting the first windings of each of said switching circuits across said source of interrogation pulses for generating an output signal in said output windings,
   a source of reference current,
   means serially connecting the second input windings of the first and third ones of said switching circuits across said source of reference current to reduce towards zero said output signal from said first switching circuit,
   means for applying said input signal of one polarity across the third input winding of said first switching circuit,
   means applying said input signal of a polarity opposite said one polarity across the serially connected third input windings of each of said second and third switching circuits, thereby to provide an output signal on the output winding of that one switching circuit whose reference current amplitude is less than the amplitude of said input signal of the same polarity by the least amount, thereby to classify said input signal of either polarity into a class in accordance with the amplitude and polarity of said reference current sources.

7. Apparatus for classifying an input electrical signal according to its amplitude into one of a plurality of amplitude defining classes comprising, in combination, a plurality of pulse type magnetic comparators each having an input winding, an interrogation winding, a reference winding and an output winding mounted on a single saturable magnetic core, a plurality of sources of reference current, means connecting each of said sources of reference current to the reference winding of a different one of said comparators for applying a magnetomotive force to each of said cores in a first sense, means connecting each of said input windings in series, means for applying said input signal across said series connected input windings for applying a magnetomotive force to each of said cores in a second sense opposite said first sense, a source of interrogation pulses, means connecting each of said interrogation windings in series across said source of interrogation pulses for applying a magnetomotive force to each of said cores in said first sense with the occurrence of each pulse, thereby to provide an output signal in the output winding of that one comparator whose reference current amplitude is less than the amplitude of said input signal by the least amount, thereby to classify said input signal into said amplitude classes in accordance with the amplitudes of said reference current sources.

8. The apparatus set forth in claim 7 wherein said interrogation pulses each have a voltage-time integral less than the flux linkage integral in any of said cores over the time duration of said interrogation pulses.

9. The apparatus set forth in claim 8 wherein said interrogation pulses each have a peak current amplitude sufficient to overcome the maximum net magnetization of any of said cores due to the maximum anticipated amplitude of the input signal.

10. Apparatus for classifying an input electrical signal according to its amplitude into one of a plurality of amplitude defining classes comprising, in combination, a first, second, and third set of pulse type magnetic comparators each having an input winding, an interrogation winding, a reference winding, and an output winding mounted on a single saturable magnetic core, a plurality of sources of reference current, means serially connecting each of said sources of reference current to the reference winding of a different one of said first and third comparators for applying a magnetomotive force to each of said cores in a first sense, means connecting the input windings of said first and second comparators in series-subtractive relationship to the input winding of said third comparator, means for applying said input signal across said series connected input windings for applying a magnetomotive force to each of said cores in a second sense opposite said first sense, by-pass means connected across the input winding of said second comparator for permitting currents of either polarity to flow through its input winding in the same direction, a source of interrogation pulses, means connecting each of said interrogation windings in series across said source of interrogation pulses for applying a magnetomotive force to each of said cores in said first sense with the occurrence of each pulse, thereby to provide an output signal in the output winding of that one comparator whose reference current amplitude is less than the amplitude of said input signal by the least amount, thereby to classify said input signal into said amplitude classes in accordance with the several current amplitudes of said reference current sources.

References Cited in the file of this patent
UNITED STATES PATENTS

| | | |
|---|---|---|
| 2,486,390 | Cunningham | Nov. 1, 1949 |
| 2,541,039 | Cole | Feb. 13, 1951 |
| 2,945,963 | Marschall | July 19, 1960 |
| 2,962,704 | Buser | Nov. 29, 1960 |
| 3,050,713 | Harmon | Aug. 21, 1962 |